US009496560B2

(12) United States Patent
Hasegawa (10) Patent No.: US 9,496,560 B2
(45) Date of Patent: Nov. 15, 2016

(54) FUEL CELL PRODUCTION METHOD (75) Inventor: Shigeki Hasegawa, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 720 days.

(21) Appl. No.: 13/272,704

(22) Filed: Oct. 13, 2011

(65) Prior Publication Data
US 2012/0100463 A1 Apr. 26, 2012

(30) Foreign Application Priority Data

Oct. 20, 2010 (JP) ................. 2010-235600

(51) Int. Cl.
| B05D 5/12 | (2006.01) |
| H01M 4/88 | (2006.01) |
| H01M 4/90 | (2006.01) |
| B82Y 30/00 | (2011.01) |
| H01M 4/92 | (2006.01) |
| H01M 8/10 | (2016.01) |

(52) U.S. Cl.
CPC ............ *H01M 4/9083* (2013.01); *B82Y 30/00* (2013.01); *H01M 4/8814* (2013.01); *H01M 4/8892* (2013.01); *H01M 4/926* (2013.01); *H01M 8/1004* (2013.01); *H01M 2008/1095* (2013.01); *Y02E 60/521* (2013.01); *Y02P 70/56* (2015.11)

(58) Field of Classification Search
None
See application file for complete search history.

(56) References Cited

U.S. PATENT DOCUMENTS

| 2002/0155340 | A1* | 10/2002 | Nanaumi et al. ................ 429/40 |
| 2004/0167014 | A1* | 8/2004 | Yan et al. ..................... 502/101 |
| 2010/0075201 | A1 | 3/2010 | Nakanishi et al. |

FOREIGN PATENT DOCUMENTS

| DE | 11 2007 000 670 T5 | 1/2009 |
| JP | 2008059841 A * | 3/2008 |
| JP | A-2009-110768 | 5/2009 |
| JP | A-2010-272437 | 12/2010 |

OTHER PUBLICATIONS

JPO PAJ machine translation for JP 2008059841A, Nakanishi et al.*

* cited by examiner

*Primary Examiner* — Barbara Gilliam
*Assistant Examiner* — Adam A Arciero
(74) *Attorney, Agent, or Firm* — Oliff PLC (57) ABSTRACT

A method of producing a fuel cell includes: preparing a plurality of carbon nanotubes that are aligned substantially vertically to a plane of a substrate; supporting an electrode catalyst on the carbon nanotubes; forming an electrode layer by disposing an ionomer formed of a first solid polymer electrolyte on a surface of the carbon nanotubes on which the electrode catalyst is supported; and placing the electrode layer to face an electrolyte membrane formed of a second solid polymer electrolyte, which has a glass-transition temperature lower than that of the first solid polymer electrolyte, and bonding the electrolyte membrane to the electrode layer by applying a pressure higher than 5 MPa between the electrolyte membrane and electrode layer at a temperature that is higher than the glass-transition temperature of the second solid polymer electrolyte and that is lower than the glass-transition temperature of the first solid polymer electrolyte.

4 Claims, 6 Drawing Sheets

FUEL CELL PRODUCTION METHOD

INCORPORATION BY REFERENCE

The disclosure of Japanese Patent Application No. 2010-235600 filed on Oct. 20, 2010 including the specification, drawings and abstract is incorporated herein by reference in its entirety.

BACKGROUND OF THE INVENTION

1. Field of the Invention

The invention relates to a method of producing a fuel cell. The invention more particularly relates to a method of producing a fuel cell that is provided with an electrode layer that contains carbon nanotubes (CNTs).

2. Description of Related Art

For example, Japanese Patent Application Publication No. 2009-110768 (JP-A-2009-110768) discloses a fuel cell production method that uses, for the polymer electrolyte present in the electrode layer, a polymer electrolyte that has a higher glass-transition temperature than the polymer electrolyte that forms the electrolyte membrane, and that carries out bonding between the electrode layer and electrolyte membrane at a temperature between the glass-transition temperatures of these polymer electrolytes. Specifically, an ink is first prepared by mixing finely divided, catalyst-loaded carbon particles with a solution of the polymer electrolyte (ionomer) and this ink is dried. An electrode layer can thereby be fabricated in which voids are formed between the finely divided carbon particles. The fabricated electrode layer and an electrolyte membrane are bonded at a temperature that is lower than the glass-transition temperature of the ionomer, and higher than or equal to the glass-transition temperature of the polymer electrolyte used in the electrolyte membrane. The execution of bonding using this temperature condition can inhibit softening of the ionomer during bonding. As a consequence, the electrode layer and electrolyte membrane can be adhered to each other while maintaining the voids between the finely divided particles that were formed during fabrication of the electrode layer.

Fuel cells that use CNT in the electrode layer in place of the aforementioned finely divided carbon particles are available. Moreover, fuel cells are also available in which this CNT is aligned vertically to the plane of the electrolyte membrane. An electrode layer that uses such vertically aligned CNT has a structure in which voids are formed between adjacent CNTs along the tube length direction of the CNTs. A high porosity can be imparted to the electrode layer as a result. However, a high void ratio also means a low carbon density. A drawback of an electrode layer that uses vertically aligned CNT is therefore facile detachment when bonded with the electrolyte membrane.

Accordingly, when vertically aligned CNT is used in the electrode layer, a method has been adopted in which bonding is carried out by applying higher pressure than in the use of finely divided carbon particles, while also softening the ionomer and/or the polymer electrolyte of the electrolyte membrane. Strong adhesion between the electrode layer and electrolyte membrane can be obtained using this method. However, when such a bonding method is employed, the vertically aligned CNT may tilt with respect to the direction vertical to the plane, i.e., collapse may occur. This has resulted in the appearance of the defective assembly.

SUMMARY OF THE INVENTION

This invention provides a fuel cell production method in which there is reduced potential for a defective membrane electrode assembly (MBA) in which an electrolyte membrane is bonded with an electrode layer that uses vertically aligned CNT.

The first aspect of the invention relates to a method of producing a fuel cell. In this method of producing a fuel cell, a plurality of CNTs that are aligned vertically to a plane of a substrate are prepared; an electrode catalyst is supported on the CNTs; an electrode layer is formed by disposing an ionomer formed of a first solid polymer electrolyte on a surface of the CNTs on which the electrode catalyst is supported; the electrode layer is placed to face an electrolyte membrane formed of a second solid polymer electrolyte, which has a glass-transition temperature lower than that of the first solid polymer electrolyte, and the electrolyte membrane is bonded to the electrode layer by applying a pressure higher than 5 MPa between the electrolyte membrane and electrode layer at a temperature that is higher than or equal to the glass-transition temperature of the second solid polymer electrolyte and that is lower than the glass-transition temperature of the first solid polymer electrolyte; and the substrate layer is removed after the electrolyte membrane and electrode layer have been bonded to each other.

According to the aforementioned aspect, when bonding is carried out between the electrode layer formed by coating the surface of the CNT with ionomer and an electrolyte membrane composed of a second solid polymer electrolyte that has a glass-transition temperature lower than that of the first solid polymer electrolyte that forms this ionomer, a pressure higher than 5 MPa can be applied between the electrolyte membrane and the electrode layer at a temperature that is higher than or equal to the glass-transition temperature of the second solid polymer electrolyte and lower than the glass-transition temperature of the first solid polymer electrolyte. Strong adhesion between the electrode layer and electrolyte membrane can be brought about when bonding is performed under these pressure conditions. In addition, by application of the aforementioned temperature conditions, compression and/or tilting of the CNT can be inhibited—even with the application of a pressure higher than 5 MPa—because the CNT is reinforced by the unsoftened ionomer. This results in an excellent inhibition of defective MEA.

In addition, the first solid polymer electrolyte in the aforementioned aspect may have a weight ratio, with regard to the CNTs grown on the substrate layer, of from at least 1.6 to lower than 3.5.

According to the aforementioned aspect, the weight ratio of the first solid polymer electrolyte can be established at from at least 1.6 to lower than 3.5 with reference to the CNT grown on the substrate layer. As a consequence, bonding between the electrolyte membrane and electrode layer can be carried out in a range of excellent reinforcement of the CNT by the ionomer.

In addition, the tube length direction of the CNTs grown on the substrate layer may have a shape in the aforementioned aspect that is not straight.

According to the aforementioned aspect, with a shape in a tube length direction of the CNT grown on the substrate layer not being a straight shape, contact points may be formed between adjacent CNTs. A structure in which the molecular chains of the polymer electrolyte readily become intertwined is provided by the formation of these contact points. Thus, in addition to the reinforcement due to the unsoftened ionomer, the strength of the CNT is further increased by mutual support among the CNTs, which provides an excellent inhibition of compression and/or tilting by the CNT.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
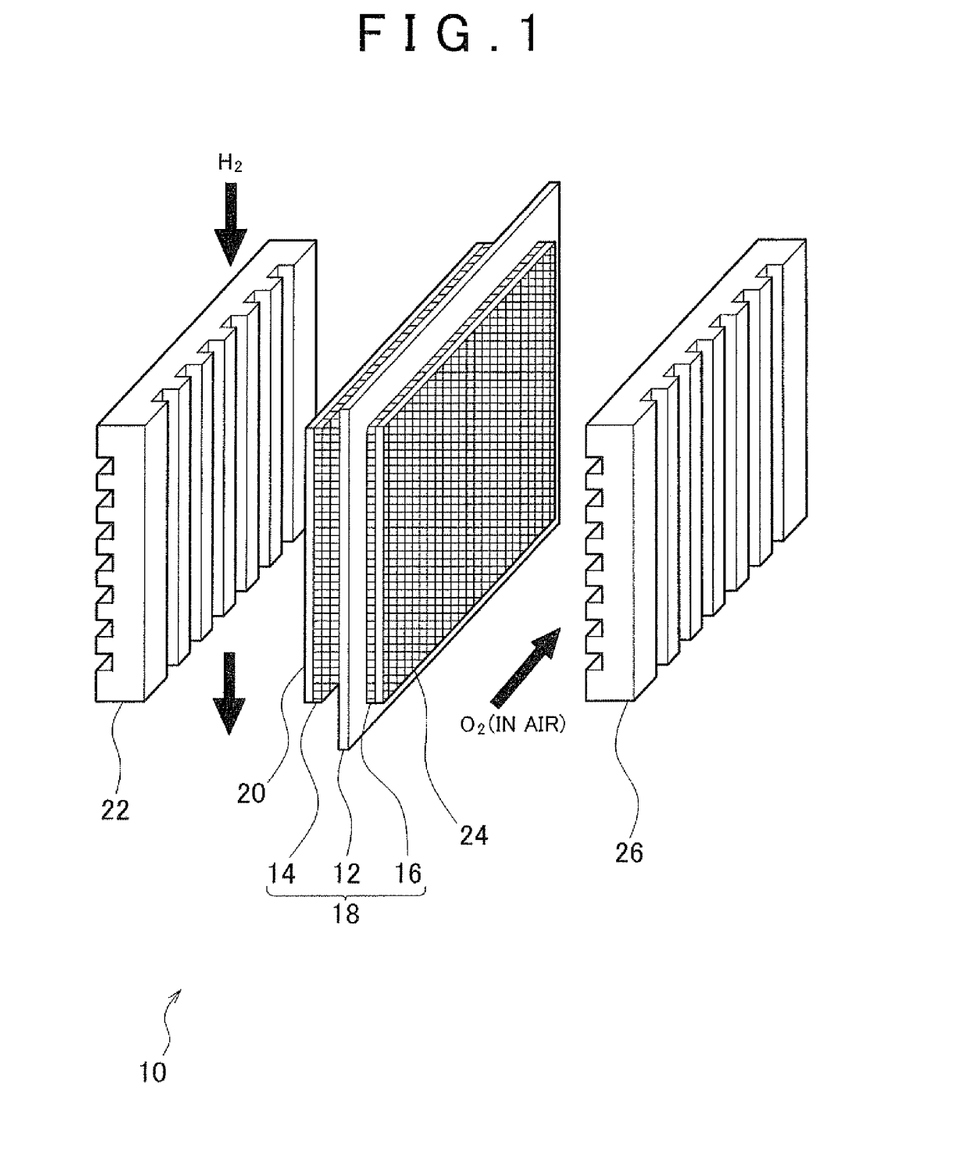
FIG. 1 is a schematic diagram of the cross-sectional structure of a fuel cell produced according to an embodiment of the invention.

As shown in FIG. 1, a fuel cell 10 is provided with an electrolyte membrane 12. The electrolyte membrane 12 is constructed from, for example, a polymer electrolyte that has a glass-transition temperature of 100° C. to 120° C. An anode electrode 14 and a cathode electrode 16 are disposed on the two sides of the electrolyte membrane 12 so as to sandwich the electrolyte membrane 12. The structural details of the anode electrode 14 and the cathode electrode 16 are described below. An MEA 18 is formed by the electrolyte membrane 12 and the anode electrode 14 and cathode electrode 16 pair that sandwiches the electrolyte membrane 12.

To the outside of the anode electrode 14 is disposed a gas diffusion layer (GDL) 20. This GDL 20 is formed of a porous material, e.g., carbon paper, carbon cloth, or a porous metal body, and functions to bring about the uniform diffusion of the gas supplied from the separator 22 into the anode electrode 14. A GDL 24 is similarly disposed to the outside of the cathode electrode 16. This GDL 24 functions to bring about the uniform diffusion of the gas supplied from the separator 26 into the cathode electrode 16. Only a single set of the MEA 18 formed as described above, GDLs 20, 24 and separators 22, 26 is shown in FIG. 1. An actual fuel cell has a stack structure in which the MEA 18 and GDLs 20, 24 are stacked in a plurality of layers across interposed separators 22, 26.

Figure 2:
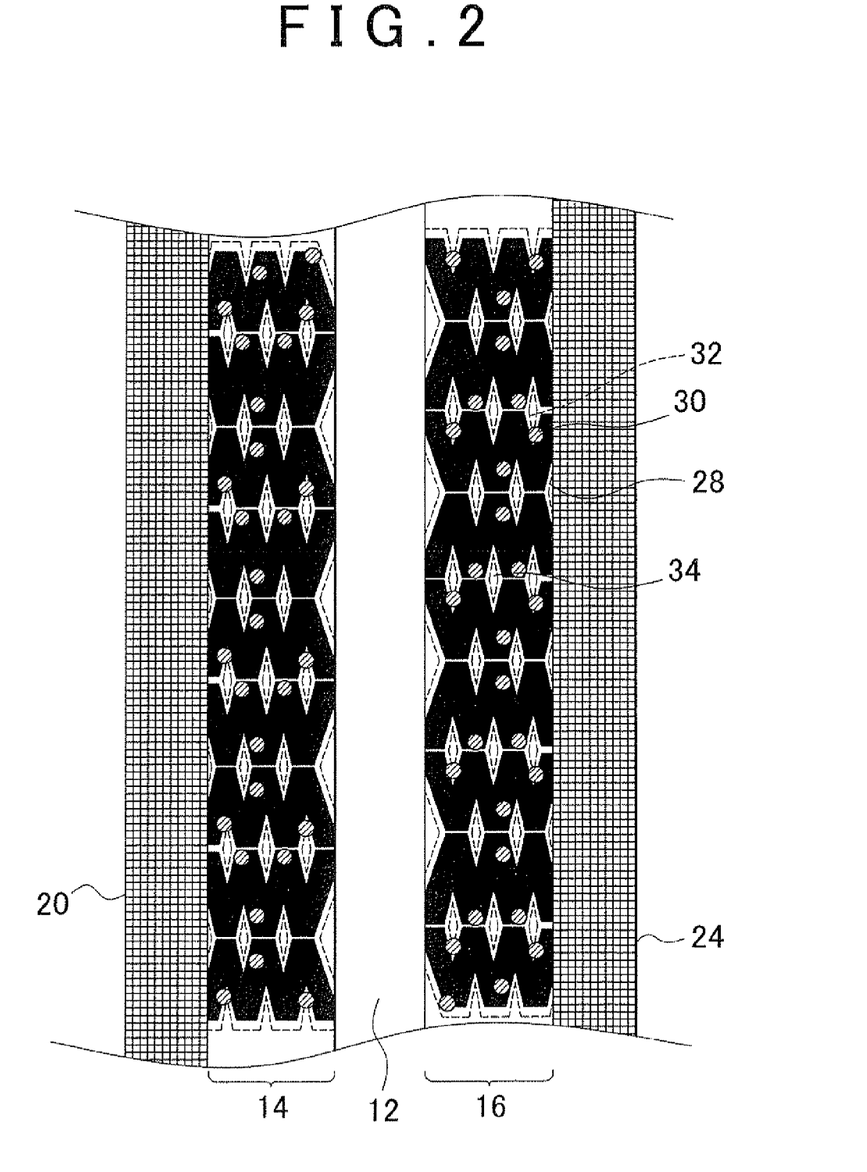
FIG. 2 is a schematic diagram of the cross-sectional structure at the MEA of FIG. 1.

The specific structure at the MEA 18 is described below with reference to FIG. 2. FIG. 2 is a schematic diagram of the cross-sectional structure at the MEA 18 of FIG. 1. As shown in FIG. 2, a plurality of vertically aligned CNTs 28 are disposed on the surface of the electrolyte membrane 12. Each of the vertically aligned CNTs 28 is a single helically shaped CNT, and each of the vertically aligned CNTs 28 is in contact with an adjacent CNT at least at one point on the outer periphery of this helical shape, while engaging in mutual support therewith, and each of the vertically aligned CNTs 28 is aligned substantially vertically to the plane of the electrolyte membrane 12. This "substantially vertically to the plane of the electrolyte membrane 12" means that the angle between the plane of the electrolyte membrane 12 and the direction of the straight line that connects the center regions of the two ends of the vertically aligned CNT 28 is 90°±10°. This includes, inter alia, the case in which this angle is not necessarily 90° due to the conditions during production. By assuming this orientation, the vertically aligned CNTs 28 form a single layer as a whole.

Also as shown in FIG. 2, an electrode catalyst 30 is disposed on the outer surface of the vertically aligned CNT 28. Platinum is used for this electrode catalyst 30, but use may also be made of particles of, for example, a metal such as ruthenium, iridium, rhodium, palladium, osmium, tungsten, lead, iron, chromium, cobalt, nickel, manganese, vanadium, molybdenum, gallium, aluminum, and so forth, or their alloys.

Also as shown in FIG. 2, the outer surface of the vertically aligned CNT 28 is coated with an ionomer 32. The ionomer 32 is composed of a polymer electrolyte that has a higher glass-transition temperature than that of the polymer electrolyte used in the electrolyte membrane 12. A polymer electrolyte that has a glass-transition temperature 20° C. to 80° C. higher and more preferably 30° C. to 50° C. higher than that of the polymer electrolyte used in the electrolyte membrane 12 may be selected for the polymer electrolyte used for the ionomer 32. As shown below, an MEA having excellent I-V characteristics can be obtained by using a polymer electrolyte having a glass-transition temperature in the aforementioned range for the ionomer 32. In addition, microscopic voids 34 are formed along the tube length direction between an ionomer 32-coated vertically aligned CNT 28 and a vertically aligned CNT 28 adjacent thereto. The thusly formed voids 34 can work as flow paths for the gas required for the electrochemical reactions and as drainage paths for the water produced by the electrochemical reactions. The polymer electrolyte used for the ionomer 32 may function as the first polymer electrolyte in the invention, while the polymer electrolyte used for the electrolyte membrane 12 may function as the second polymer electrolyte in the invention.

The individual steps in the method of producing the fuel cell 10 with the previously described structure are described in the following with reference to FIG. 3. The fuel cell 10 can be produced through (1) a CNT preparation step, (2) a catalyst support step, (3) an ionomer coating step, and (4) a transfer (MEA fabrication) step. Each of these steps is described in detail below.

Figure 3:
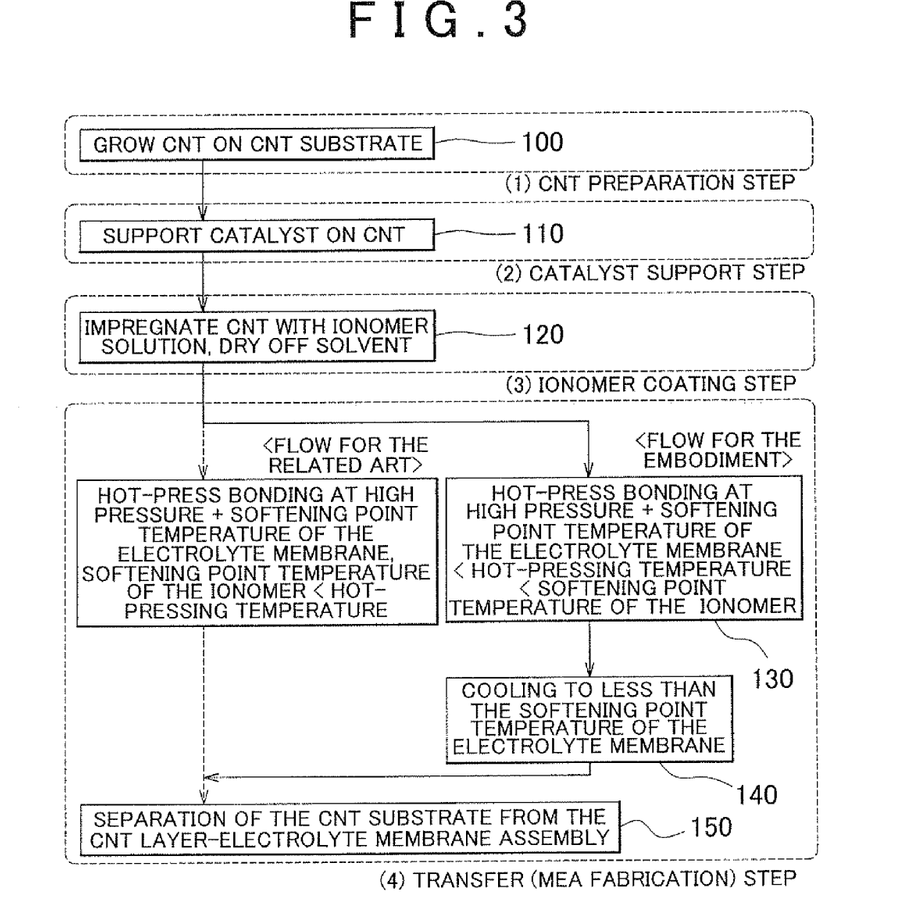
FIG. 3 is a diagram that describes the individual steps in a fuel cell production method according to the related art and the fuel cell production method according to an embodiment of the invention.

The CNT preparation step (1) is a step of preparing CNTs that are aligned substantially vertically to a plane of a CNT substrate (step 100 in FIG. 3). This step is a step in which a seed catalyst layer (catalyst layer for CNT growth) is supported on a CNT substrate, e.g., silicon, and vertically aligned CNTs are grown by introducing a carbon source gas under a high temperature atmosphere. Methods as described in, for example, Japanese Patent Application Publication No. 2005-097015 (JP-A-2005-097015) and Japanese Patent Application Publication No. 2007-257886 (JP-A-2007-

257886) can be used for this step. This "substantially vertically to a plane of a CNT substrate" means that the angle between the plane of the CNT substrate and the direction of the straight line that connects the center regions of the two ends of the CNT is 90°±10°. The CNT substrate may function as the substrate layer of the invention.

The catalyst support step (2) is a step of supporting an electrode catalyst on the grown CNT (step 110 in FIG. 3). In a specific example of a method for supporting the electrode catalyst, the CNT surface is coated with a solution of the salt of a metal given as an example of the electrode catalyst 30 in FIG. 2, followed by reduction by heating to at least 200° C. under hydrogen atmosphere. The metal salt solution may be an aqueous solution or an organic solvent solution. The method of applying the metal salt solution to the CNT surface can be exemplified by immersion of the CNT in the metal salt solution, dripping the metal salt solution on the surface of the CNT, and spraying the metal salt solution on the CNT surface.

When platinum is used for the electrode catalyst, the metal salt solution can be, for example, a platinum salt solution prepared by the dissolution of a suitable amount of, for example, chloroplatinic acid or a platinum nitrate solution (e.g., a dinitrodiamine platinum nitrate solution) in an alcohol such as ethanol or isopropanol. Viewed from the perspective of achieving a uniform loading of the platinum on the CNT surface, the use of a platinum salt solution prepared by the dissolution of a dinitrodiamine platinum nitrate solution in an alcohol is particularly favorable.

The ionomer coating step (3) is a step of coating the ionomer on the surface of the electrode catalyst-supporting CNT (step 120 in FIG. 3). Coating with the ionomer is performed by (i) immersing the CNT in a solution of the ionomer and then bringing about a uniform impregnation of the ionomer solution by vacuum degassing and (ii) subsequently removing the solvent by vacuum drying. The ionomer can be coated in a desired amount on the CNT surface by repeating this (i) and (ii). An electrode layer (referred to below as the CNT layer) in which voids are formed between neighboring CNTs can be fabricated by the disposition of the ionomer in a desired amount.

Application of the ionomer is not limited to the methods described above, and the ionomer may be coated on the CNT surface by spraying, die coating, dispensing, screen printing, and so forth, a solution prepared by dispersing or dissolving the ionomer. In addition, the ionomer may be coated in the form of the polymer as described above or in the form of a precursor (monomer) for the ionomer. In this case, a polymerization composition containing the ionomer precursor and additive, e.g., any of various polymerization initiators and so forth, is coated on the CNT surface and polymerization is then carried out by the application of heat or exposure to radiation such as ultraviolet radiation. This can dispose the ionomer in a desired amount on the CNT surface just like the previously described method.

The amount of ionomer used during application of the ionomer may be adjusted to provide a weight ratio (I/C) for the ionomer to the carbon constituting the CNT of 1.6 to 3.5. Since, as described below, the ionomer is used as reinforcement for the CNT, I/C is desirably at least 1.6 in order to bring about a satisfactory manifestation of this function. On the other hand, an I/C of 3.5 or more is unfavorable because at such an I/C the voids formed between neighboring CNTs are clogged, causing a reduction in gas diffusibility and drainage performance. The I/C can be established based on the weight of the carbon before and after the previously described CNT growth step (2).

The transfer step (4) is a step of transferring the CNT layer to both sides of the electrolyte membrane (steps 130 to 150 in FIG. 3). In the transfer step of this embodiment, the surface of the electrolyte membrane is first placed facing the CNT growth end side of the CNT layer and hot-press bonding is performed by applying high pressure therebetween while heating to a temperature that is higher than or equal to the glass-transition temperature of the polymer electrolyte used in the electrolyte membrane and lower than the glass-transition temperature of the polymer electrolyte used for the ionomer (step 130 in FIG. 3). Cooling is then carried out to a temperature lower than the glass-transition temperature of the polymer electrolyte used in the electrolyte membrane (step 140 in FIG. 3). By doing this, a CNT substrate—CNT layer—electrolyte membrane assembly can be produced in which the CNT is aligned substantially vertically to the plane of the electrolyte membrane.

Figure 4:
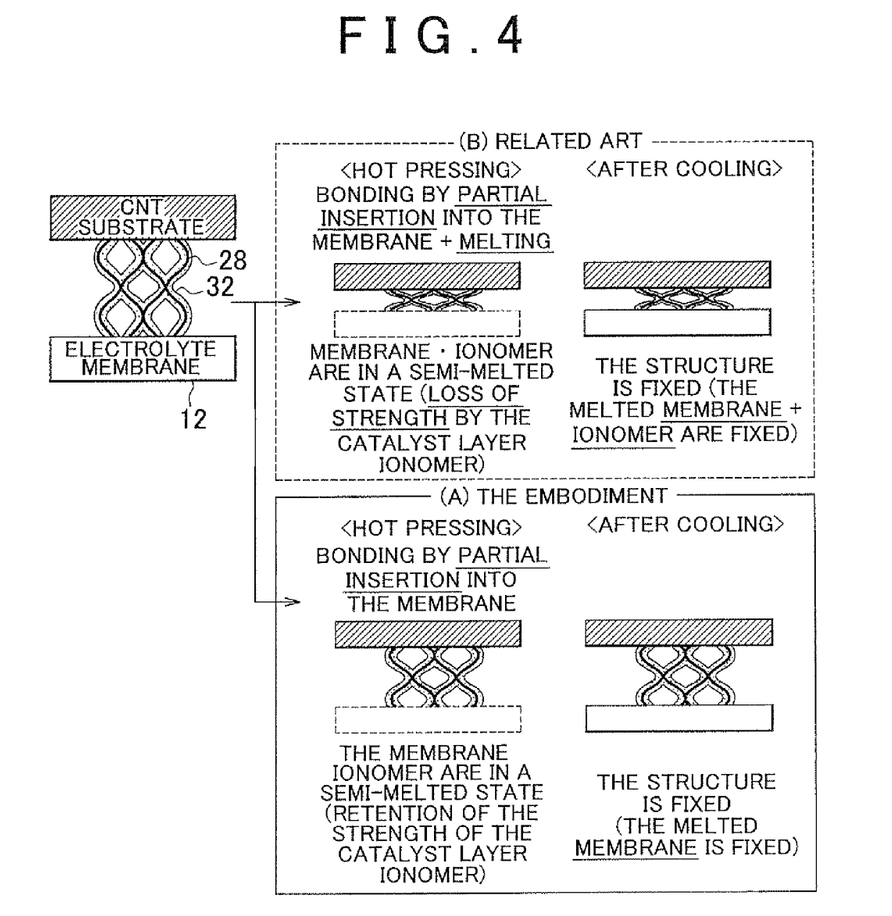
FIG. 4A is a diagram that describes the hot-press bonding conditions in the transfer step of an embodiment of the invention.
FIG. 4B is a diagram that describes the hot-press bonding conditions in the transfer step in the related art.

The details with regard to the use of the hot-press bonding conditions described above for steps 130 and 140 in FIG. 3 will be considered using FIG. 4. FIG. 4A shows the hot-press bonding conditions in the transfer step of this embodiment, while FIG. 4B shows the hot-press bonding conditions in the transfer step of the related art that corresponds to this.

In the hot-press bonding conditions in the transfer step of the related art, heating is performed to at least the glass-transition temperature of the polymer electrolyte used in the electrolyte membrane and at least the glass-transition temperature of the polymer electrolyte used for the ionomer, and this is done while applying high pressure. These hot-press bonding conditions are adopted due to the structure within the grown CNT layer. Thus, voids are formed in the CNT layer along the tube length direction between adjacent CNTs. As a result, a higher void ratio can be achieved for the CNT layer than for the use of ordinary carbon particles, but adherence to the electrolyte membrane is impaired because the carbon density is then lowered. Accordingly, in order to bond the CNT layer to the electrolyte membrane, the CNT must be forced to embed in the electrolyte membrane through the application of a higher pressure (5 MPa to 15 MPa) than is the case when ordinary carbon particles are used.

However, when such high-pressure hot-press bonding conditions are adopted, as shown in FIG. 4B the CNT compresses and the CNT layer thickness undergoes a substantial reduction. In addition, when the CNT compresses or tilts, variations are produced in the CNT layer thickness, and the variations can produce the defective contact which increases the resistance between the CNT and GDL.

In view of this, the hot-press bonding conditions in the transfer step of this embodiment are heating, while applying a high pressure as above, to a temperature that is higher than or equal to the glass-transition temperature of the polymer electrolyte used in the electrolyte membrane, and lower than the glass-transition temperature of the polymer electrolyte used for the ionomer. When these hot-press bonding conditions are used, the strength of the CNT can be raised without causing softening of the ionomer, and because of this the compression and tilting of the CNT caused by the application of pressure can be inhibited. As shown in FIG. 4A, the embedded portion of the CNT bonds with the semi-melted electrolyte membrane, while the other, major portion of the CNT undergoes just a gentle compression. When the heating is stopped and cooling is performed to lower than or equal to the glass-transition temperature of the polymer electrolyte used in the electrolyte membrane, this polymer electrolyte undergoes hardening and the structure becomes fixed. The use of the hot-press bonding conditions in the transfer step of this embodiment can mitigate variations in the CNT layer thickness and can reduce contact defects between the CNT and GDL and as a consequence can inhibit increases in the resistance.

The transfer step of this embodiment then continues with separation of the CNT substrate from the CNT layer—electrolyte membrane assembly (step 150 in FIG. 3). Specifically, the CNT substrate side is immersed in an acid or base solution and the seed catalyst layer or seed catalyst formed on the CNT substrate is dissolved, separated, and removed. The acid or base solution can be selected as appropriate in correspondence to the chemical properties of the substances used for the seed catalyst layer or seed catalyst. The CNT substrate and CNT layer—electrolyte membrane assembly may be separated by pulling or peeling. Using the preceding steps, an MEA can be fabricated in which helical CNT is aligned substantially vertically to the plane of the electrolyte membrane. The fuel cell 10 can be produced by sandwiching the thusly fabricated MEA by GDLs and separators as described above.

Figure 5:
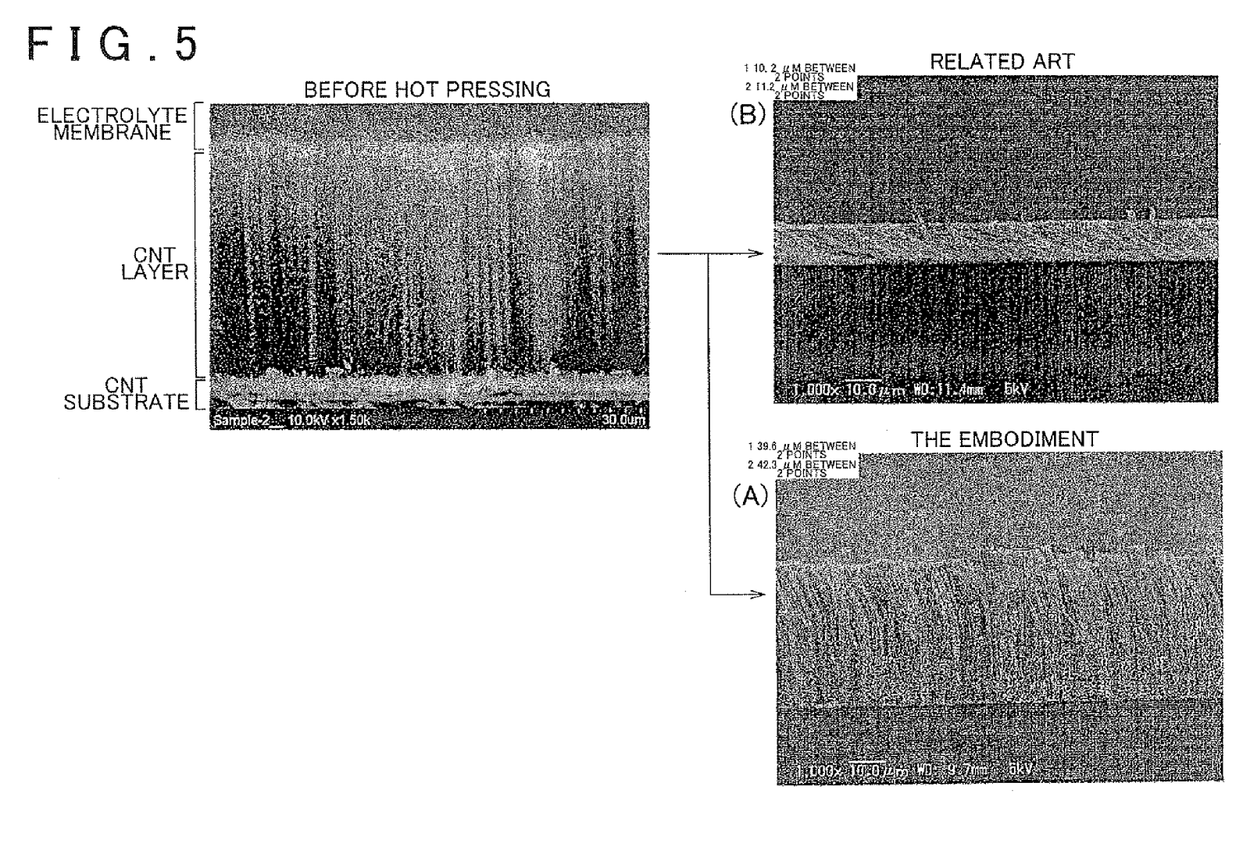
FIG. 5A is a scanning electron microscope (SEM) photograph of the CNT substrate—CNT layer—electrolyte membrane assembly obtained by fabrication using the hot-press bonding conditions in a transfer step according to an embodiment of the invention.
FIG. 5B is an SEM photograph of the CNT substrate—CNT layer—electrolyte membrane assembly obtained by fabrication using the hot-press bonding conditions in a transfer step according to the related art.

FIG. 5 contains an SEM photograph of a CNT substrate—CNT layer—electrolyte membrane assembly obtained by transfer under the conditions in the transfer step of this embodiment and an SEM photograph of a CNT substrate—CNT layer—electrolyte membrane assembly obtained by transfer under the conditions in a transfer step according to the related art. FIG. 5A corresponds to the hot-press bonding conditions in the transfer step according to this embodiment (i.e., the hot-press bonding conditions in FIG. 4A) and FIG. 5B corresponds to the hot-press bonding conditions in a transfer step according to other related technologies.

As shown in FIG. 5A, the alignment direction of the CNT is shown to undergo almost no change pre-versus post-hot-press bonding in the case of the hot-press bonding conditions of the transfer step of this embodiment. The reason is that the structure of the CNT layer can be maintained pre-versus post-compression due to the action of the ionomer as reinforcement for the CNT. On the other hand, as shown in FIG. 5B, in the case of the hot-press bonding conditions in the transfer step of the related art, the structure of the CNT layer has become fixed in a state in which the CNT is tilted. In this case, the possibility of the problem which is described above, i.e., defective or variation in the CNT layer thickness is high.

Figure 6:
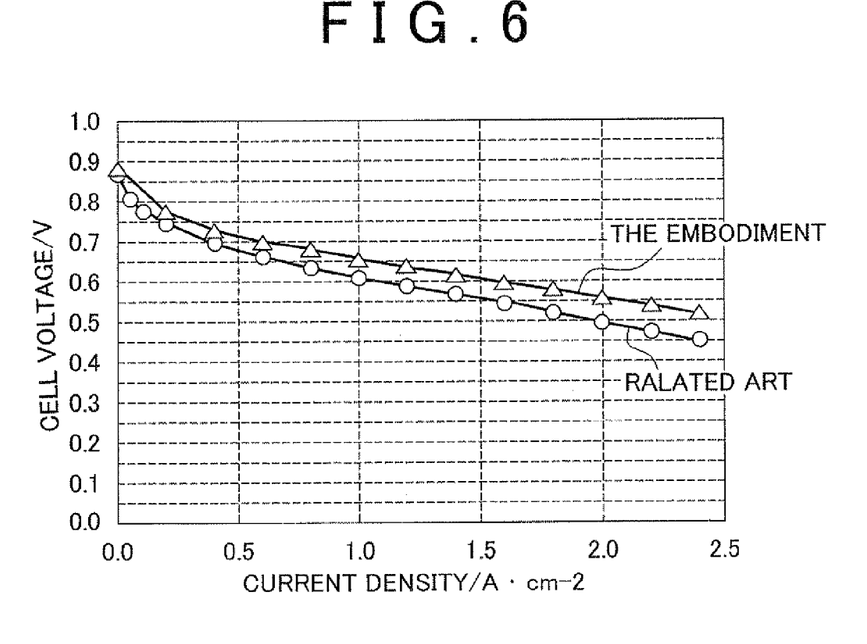
FIG. 6 is a current—voltage (I-V) characteristic diagram of an MEA obtained by fabrication using the hot-press bonding conditions in a transfer step according to an embodiment of the invention and an MEA obtained by fabrication using the hot-press bonding conditions in a transfer step according to the related art.

The I-V characteristic diagrams are shown in FIG. 6 for an MBA obtained by transfer using the conditions in the transfer step in this embodiment and an MEA obtained by transfer using the conditions in a transfer step according to the related art. In FIG. 6, Δ refers to the I-V characteristic diagram for an MEA produced using the hot-press bonding conditions in the transfer step of this embodiment. Specifically, the MEA used here was produced by positioning an ionomer-coated CNT layer (the ionomer was a polymer electrolyte having a glass-transition temperature of at least 150° C.) facing an electrolyte membrane (polymer electrolyte with a glass-transition temperature of 100° C. to 120° C.) and applying a pressure of 10 MPa at a temperature of 140° C. On the other hand, the ○ in FIG. 6 refers to the I-V characteristic diagram for an MEA produced using the hot-press bonding conditions in the transfer step of the related art. The MEA used here was produced using the same polymer electrolyte for the ionomer as for the electrolyte membrane. As demonstrated in FIG. 6, the MEA fabricated using the hot-press bonding conditions in the transfer step of this embodiment is shown to exhibit a higher voltage value, from the low current region to the high current region, than the MBA fabricated using the hot-press bonding conditions in the transfer step of the related art. It means that the MEA fabricated using the hot-press bonding conditions in the transfer step of this embodiment has substantially improved characteristics as a fuel cell.

The results are shown in Table 1 for an evaluation of the I-V characteristics (cell resistance) when the hot-press bonding conditions described by FIG. 4A and the I/C were changed. These I-V characteristic tests used a CNT layer coated with a polymer electrolyte with a glass-transition temperature of at least 150° C. and an electrolyte membrane composed of a polymer electrolyte with a glass-transition temperature of 100° C. to 120° C. The evaluation of I-V characteristics were performed by comparing with the data of the sample using a transfer temperature of 140° C., a transfer pressure of 10 MPa, and an I/C of 2.0 for the benchmark.

TABLE 1

| | | transfer | | | I-V characteristics results | |
|---|---|---|---|---|---|---|
| MEA parameters | | temperature [° C.] | pressure [MPa] | ionomer I/C | of the evaluation | comment |
| sensitivity to transfer pressure | 10 MPa transfer | 140 | 10 | 2.0 | ○ | excellent |
| | 5 MPa transfer | 140 | 5.4 | 2.0 | Δ | somewhat elevated resistance |
| | 3 MPa transfer | 140 | 3.1 | 2.0 | x | high resistance |
| sensitivity to transfer temperature | 180° C. transfer | 180 | 10 | 2.0 | x | the membrane underwent yellowing |
| sensitivity to I/C | 1.6 I/C | 140 | 10 | 1.6 | ○ | excellent |
| | 1.0 I/C | 140 | 10 | 1.0 | x | substantial electrode collapse (→ large concentration over voltage) |
| (reference) standard conditions for conventional electrode MEA | | 130 | 3.0 | 0.8 | | — |

As demonstrated in Table 1, when the transfer pressure was changed, a high cell resistance was observed when a low transfer pressure was used. In the particular case of transfer at 3.1 MPa, a high cell resistance due to an inadequate adherence between the CNT layer and the electrolyte membrane is demonstrated. The electrolyte membrane underwent yellowing when the transfer temperature was changed to 180° C. The reason for this is believed to be as follows: when the transfer temperature is too high, decomposition and so forth occurs in regions of the polymer electrolyte. When the I/C was varied, the cell resistance at I/C=1.6 was the same as in the benchmark, while substantial collapse of the CNT layer occurred at I/C=1.0. This demonstrates that an adequate reinforcement of the CNT layer could not be obtained when a small amount of ionomer was applied.

In accordance with the fuel cell production method in this embodiment as described in the preceding, the strength of the CNT can be raised during transfer without causing softening of the ionomer. As a consequence, in the above transfer step (4) the compression and tilting of the CNT caused by the application of high pressures can be inhibited. An excellent inhibition defective MEA can be had as a result.

The vertically aligned CNT 28 has a helical shape in this embodiment, but may have, for example, a corrugated shape. That is, there are no particular limitations on the shape of the vertically aligned CNT 28 as long as, when the CNT layer is viewed from the side, at least one point of contact is present between a particular CNT and the neighboring CNT and these CNTs, while engaging in mutual support, are aligned substantially vertically to the plane of the electrolyte membrane.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A method of producing a fuel cell, comprising:
   preparing a plurality of carbon nanotubes that are aligned vertically to a plane of a substrate;
   supporting an electrode catalyst on the carbon nanotubes;
   forming an electrode layer by disposing an ionomer formed of a first solid polymer electrolyte having a glass-transition temperature of at least 150° C. on a surface of the carbon nanotubes on which the electrode catalyst is supported;
   placing the electrode layer to face an electrolyte membrane formed of a second solid polymer electrolyte, which has a glass-transition temperature of 100° C. to 120° C., and bonding the electrolyte membrane to the electrode layer such that the ionomer on the surface of the carbon nanotubes is not softened and a portion of the carbon nanotubes is embedded in the semi-melted electrolyte membrane, by applying a pressure of 10 MPa to 15 MPa between the electrolyte membrane and electrode layer at a temperature that is higher than or equal to 120° C. and that is lower than 150° C.; and
   stopping heating, performing cooling and removing a substrate layer after the electrolyte membrane and electrode layer have been bonded to each other,
   wherein the first polymer electrolyte has a weight ratio, with regard to the carbon nanotube grown on the substrate layer, of 1.6 to 2.0.

2. The method of producing a fuel cell according to claim 1, wherein a shape in a tube length direction of the carbon nanotubes grown on the substrate layer is not a straight shape.

3. The method of producing a fuel cell according to claim 1, wherein a shape in a tube length direction of the carbon nanotubes grown on the substrate layer is a helical shape.

4. The method of producing a fuel cell according to claim 1, wherein the glass-transition temperature of the first polymer electrolyte is 30° C. to 50° C. higher than the glass-transition temperature of the second polymer electrolyte.

* * * * *